United States Patent [19]

Inoue

[11] 4,438,312
[45] Mar. 20, 1984

[54] METHOD OF AND DEVICE FOR CONDUCTING MACHINING CURRENT TO A WIRE-ELECTRODE TOOL IN A WIRE-CUTTING ELECTROEROSION MACHINE

[75] Inventor: Kiyoshi Inoue, Tokyo, Japan

[73] Assignee: Inoue-Japax Research Incorporated, Yokohama, Japan

[21] Appl. No.: 268,012

[22] Filed: May 28, 1981

[30] Foreign Application Priority Data

Jun. 4, 1980 [JP] Japan .............................. 55-77677[U]

[51] Int. Cl.³ .............................. B23P 1/10; B23P 1/12
[52] U.S. Cl. .............................. 219/69 W; 219/69 M; 310/229; 339/5 R; 339/5 A
[58] Field of Search .............. 219/69 W, 69 D, 69 E, 219/69 P, 69 C, 69 R, 68, 137.61; 310/228, 219, 229, 230, 231, 249; 339/5 R, 5 A, 5 S, 8 A, 6 A

[56] References Cited

U.S. PATENT DOCUMENTS

| | | | |
|---|---|---|---|
| 3,098,148 | 7/1963 | Piot et al. | 219/69 E |
| 3,835,436 | 9/1974 | Klaudy | 310/219 |
| 3,855,441 | 12/1974 | Kimmelmann | 219/69 D |
| 4,193,852 | 3/1980 | Inoue | 219/69 W |

FOREIGN PATENT DOCUMENTS

| | | | |
|---|---|---|---|
| 2519067 | 11/1976 | Fed. Rep. of Germany | 310/229 |
| 1,374,243 | 11/1974 | United Kingdom | 310/231 |

*Primary Examiner*—M. H. Paschall
*Attorney, Agent, or Firm*—Karl F. Ross; Herbert Dubno

[57] ABSTRACT

A device for conducting a machining current to a traveling wire-electrode tool in a wire-cutting electroerosion machine comprises a rotary brush block (e.g. of cylindrical shape) having a planar current-conducting surface disposed in a wire-travel path for making sliding electrical contact with the moving wire-electrode tool. A motor rotates the brush block about the rotary axis thereof to rotationally move the current-conducting surface in tangential sliding electrical contact with the moving wire-electrode tool. A scraper is provided downstream of the workpiece machining zone and upstream of the brush block to remove abrasive particles and machining chips and other products (e.g. tar) adherent on the wire tool fed from the machining zone, thus to prevent them from being carried onto the brush surface.

7 Claims, 1 Drawing Figure

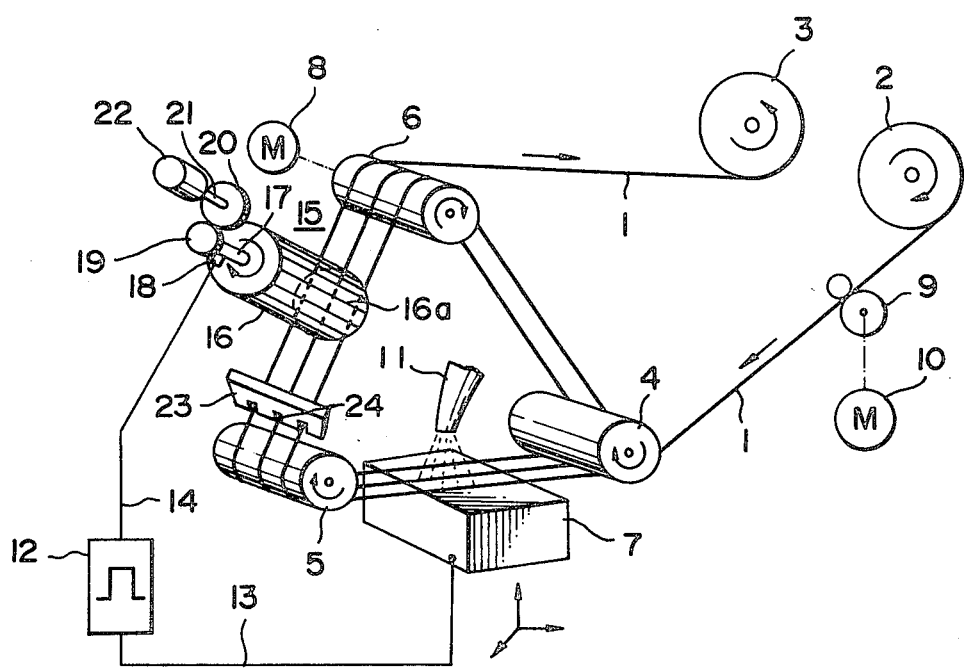

METHOD OF AND DEVICE FOR CONDUCTING MACHINING CURRENT TO A WIRE-ELECTRODE TOOL IN A WIRE-CUTTING ELECTROEROSION MACHINE

FIELD OF THE INVENTION

The present invention relates generally to a wire-cutting electroerosion machine and, more particularly, to an improved and novel device for conducting a machining current to a traveling wire-electrode tool in a wire-cutting electroerosion machine and an improved wire-cutting electroerosion machine including such a novel current-conducting device.

BACKGROUND OF THE INVENTION

A wire-cutting electroerosion machine, which is also called a traveling-wire electroerosion machine, commonly makes use of a thin elongated electrode tool in the form of a wire, filament or tape (herein generally called "wire-electrode tool") composed of, say, tungsten, brass or copper and having a thickness generally from 0.05 to 0.5 mm. The machine commonly includes drive means, e.g. capstan and pinch rollers, for axially moving the wire-electrode tool along a continuous path extending from a supply side, e.g. a storage reel, to a collection side, e.g. a takeup reel, through the region of a workpiece. Included also in the machine is an electroerosion power supply for feeding a machining current between the moving wire-electrode tool and the workpiece across a small machining gap flooded with a liquid machining medium which may be either a liquid electrolyte or a liquid dielectric such as distilled water or kerosene. The power supply is typically or preferably adapted to furnish between the electrode tool and the workpiece a succession of electrical pulses to electrically energize the liquid-filled machining gap. When the gap is energized, stock of the workpiece is removed electrophysically and/or electrochemically, depending on the type of the liquid machining medium, to "machine" the workpiece. In a certain sophisticated electroerosive wire-cutting machine, abrasive media are included in the machining liquid to mechanically assist the stock removal or promote the stability of the electroerosion action, thereby enhancing the efficiency of the stock-removal process. As stock removal proceeds, the workpiece is displaced relative to the axially moving electrode tool and generally transverse to the axis thereof along a prescribed path, conveniently under the commands of a numerical control (NC) unit, to form a desired cut in the workpiece with due precision.

For conducting the machining current to the moving wire-electrode tool, a brush is customarily used and connected to one output terminal of the power supply whose other output terminal is connected to the workpiece. The brush in the form of a block is customarily disposed intermediate adjacent guide members and positioned to bear against the wire-electrode tool moving from one guide member to the other. To ensure satisfactory bearing electrical contact with the moving wire-electrode tool, the brush must be urged under considerable pressure against the tool which is thin and stretched tightly while moving. Thus, the brush wears away, forming a groove therein with its width corresponding to the thickness of the wire-electrode tool. The depth of the groove increases rapidly so that the brush becomes useless and its replacement by a new brush becomes necessary in a relatively short period of time. The time in which the brush becomes useless is further reduced when the machining liquid has abrasive media suspended therein. It can be seen, therefore, that the conventional tool-conducting arrangement gives rise to practical problems and have considerably limited the efficiency of wire-cutting electroerosion machines.

OBJECTS OF THE INVENTION

It is, accordingly, an important object of the present invention to provide an improved device for conducting, with a brush block, a machining current to an axially moving wire-electrode tool in a wire-cutting electroerosion machine, which device is capable of markedly extending the useful life of the brush block.

Another object of the invention is to provide a wire-cutting electroerosion machine incorporating such an improved tool-conducting device whereby its operational efficiency is markedly increased.

SUMMARY OF THE INVENTION

These objects and others which will become apparent hereinafter are attained by providing, in accordance with the present invention, a device for conducting a machining current to a continuous wire-electrode tool in a wire-cutting electroerosion machine which includes drive means for axially moving the wire-electrode tool tautly stretched from a supply site to a collection site, along a predetermined path continuous between the supply and collection sites and extending through the region of a workpiece and power supply means having a pair of output terminals for feeding the machining current between the wire-electrode tool and the workpiece across a machining gap flooded with a liquid machining medium, which device comprises: a brush block electrically connectable to one of the output terminals of the power supply and having a planar current-conducting surface disposed in the said predetermined continuous path for making sliding electrical contact with the axially moving wire-electrode tool; a rotary shaft secured to the brush block and having an axis of rotation perpendicular to the said current-conducting surface; and motor means drivingly coupled to the rotary shaft for rotating the brush block about the said axis to rotationally move the said planar current-conducting surface in tangential sliding contact with the axially moving wire-electrode tool.

BRIEF DESCRIPTION OF THE DRAWING

The sole FIGURE in the accompanying drawing is a perspective view diagrammatically illustrating a wire-cutting electroerosion machine arrangement incorporating a device according to the invention.

SPECIFIC DESCRIPTION

In the arrangement shown, a continuous wire-electrode tool 1 composed of copper, brass, tungsten or like conventional wire-electrode material and having a diameter or thickness of 0.05 to 0.5 mm is fed from a supply reel 2 and collected onto a takeup reel 3. The continuous path of the wire-electrode tool 1 includes three parallel guide rolls 4, 5 and 6 around which it is engaged a plurality of times to form a web defining an enclosed area therebetween. The continuous wire-electrode tool 1 is tautly stretched across the supply reel 2 and the takeup reel 3 all the way therebetween. The wire-electrode tool 1 extending between the rolls 4 and 5 in the downwardly directed flat side of the triangle defines a cutting area for a workpiece 7. The guide rolls 4, 5 and 6 are preferably multi-grooved to accept the plural turns of the wire-electrode tool 1 so that they may not move out of position.

The guide rolls 4 and 5 are designed to be rotatable about their axes and the guide roller 6 is rotated about its axis by a motor 8 to axially move the wire-electrode tool 1 continuously extending between the supply reel 2 and the takeup reel 3 through the region of the workpiece 7. Intermediate between the supply reel 2 and the guide roll 4, brake rolls 9 are provided and driven by a motor 10 to give a sufficient tension onto the plural turns of the wire-electrode tool 1 axially driven around the guide rolls 4, 5 and 6.

The workpiece 7 is customarily carried on a worktable (not shown) which is driven by motors (not shown) to displace the workpiece 7 into a machinable relationship with the plural parallel turns of the wire-electrode tool 1 extending between the rolls 4 and 5. The workpiece 7 is then displaced with the worktable one-, two-, or three-dimensionally to electroerosively machine desired cuts therein with the turns of the wire-electrode tool 1. A nozzle 11 disposed above the workpiece 7 furnishs a liquid machining medium, e.g. distilled water or electrolyte, in the cutting zone defined by the plural parallel stretches of the tool 1 and the workpiece 7. The machining liquid preferably contains fine abrasive particles, e.g. with particle sizes of 1 to 100 microns and composed of titamium carbide, titanium nitride, boron carbide, boron nitride, silicon carbide, aluminum oxide and/or silicon oxide, suspended therein to mechanically assist the machining process.

An electroerosion machining current, typically or preferably in the form of a succession of electrical pulses is furnished from a power supply 12 across the machining gap to electroerosively remove stock from the workpiece 7. To this end, the power supply 12 has one output terminal electrically connected to the workpiece 7 via a cable 13 and a conducting block (not shown) to which the workpiece 7 is fixedly secured. The other terminal of the power supply 12 is electrically connected via a cable 14 to the plural parallel stretches of the wire-electrode tool 1 extending and traveling from the guide roll 5 to the guide roll 6, via a current-conducting device 15 according to the invention.

The current-conducting device 15 includes a rotary brush block 16 in the form of a cylinder or cylindrical column and composed of a customary brush material such as carbon. The block 16 has one planar end face 16a disposed in contact with the plural turns of the wire-electrode tool 1 extending between the guide rolls 5 and 6. The block 16 may be driven under pressure means, e.g. spring (not shown) to urge the end face 16a into pressure contact with the plural parallel stretches of the wire-electrode tool 1. A rotary shaft 17 is securely fixed to the cylindrical brush block 14 coaxially with the axis thereof perpendicular to the plane of the end face 16a and, as it is rotated, is held in sliding contact with a stationary brush piece 18 connected to the cable 14 leading to the electroerosion power supply 12. A spur gear 19 is securely coupled to the shaft 18 and is in mating engagement with a spur gear 20 which is in turn securely coupled to the drive shaft 21 of a motor 22, e.g. a DC motor or stepping motor. The motor 22 is driven continuously. The rotation of the motor 22 is transmitted via the gears 20, 19 to the shaft 18 to rotate the cylindrical brush block 16 fed via the stationary brush piece 18 with the machining current from the conductor 14. Thus, the end face 16a of the block 16 is rotationally moved in tangential sliding contact with the plural parallel stretches of the wire-electrode tool 1 running between the guide rolls 5 and 6 and consequentially diminishes or wears away substantially uniformly over its entire area. Accordingly, the brush block 16 diminishes in the direction of its thickness at a rate of wear much reduced compared with a customary brush as constructed and arranged in the conventional manner, which wears away by being grooved. Accordingly, a brush block according to the invention is capable of withstanding much prolonged service and has a useful life much longer than a brush constructed and arranged according to the prior art.

For example, in a wire-cutting electroerosion operation using a copper wire-electrode tool of a diameter of 0.2 mm, a conventional carbon brush diminishes at a rate of wear of 1.8 mm/hour whereas a carbon brush block constructed generally as shown and rotated at 10 RPM according to the invention diminishes at a rate of wear of 0.06 mm/hour, much less than the conventional wear rate, and retains a continuously renewed constant brush face to allow the machining operation to continue at an increased stability and to be achieved at an enhanced machining efficiency.

Shown at 23 is a scraper plate or block composed of carbon or plastic and shaped to accept in a closely fitting manner in its multiple grooves 24 the running plural stretches of the wire-electrode tool 1, respectively, to scrape off abrasive media and/or machining chips and other products adherent on these wire stretches running into engagement with the contact face 16a of the rotary btrush block 16 between the guide rolls 5 and 6. The scraper 23 is urged by spring or like pressure means into a pressure contact or engagement with the plural wire-tool stretches to prevent such abrasive and machining product particles from entering between the brush face 16a and the wire tool 1. The abrasive particles and machining chips, tar and the other products will accelerate the wear of the brush face 16a and tend to disturb smooth current conduction between the brush face 16a and the wire-electrode tool 1. Therefore, provision of the scraper 23 reduces the wear of the brush face 16a and the wire-electrode tool and insures stabilized current conduction between the brush face 16a and the wire-electrode tool 1.

There is thus provided, in accordance with the present invention, a novel device for conducting a machining current to a traveling wire-electrode tool in a wire-cutting electroerosion machine, the device having a brush serviceable much longer than those of the prior-art devices and providing an improved current-conducting performance.

What is claimed is:

1. A traveling-wire electroerosion machine, comprising:

drive means for axially moving a wire-electrode tool which is tautly stretched from a supply site to a collection site, along a predetermined path continuously extending between said supply and collection sites through the region of a workpiece;

power supply means having a pair of output terminals for feeding a machining current between said moving wire-electrode tool and said workpiece across a machining gap flooded with a liquid machining medium; and a device for conducting said machining current to said moving continuous wire electrode tool from said power supply means, the device comprising:
  a brush block electrically connected to one of said output terminals and having a planar current-conducting surface disposed at a location in said predetermined path for making sliding electrical contact with said axially moving wire-electrode tool,
  a rotary shaft secured to said brush block and having an axis of rotation generally perpendicular to said planar current-conducting surface, and
  motor means drivingly coupled to said rotary shaft for rotating said brush block about said axis to rotationally move said planar current-conducting surface in tangential sliding contact with said axially moving continuous wire-electrode tool.

2. The machine defined in claim 1, further comprising a scraper body disposed between said machining gap and said location and shaped to accept said moving wire-electrode tool for scraping off gap products adherent on said wire-electrode tool, thereby preventing them from being introduced onto said current-conducting surface.

3. The machine defined in claim 1, further comprising a plurality of guide rolls around which said continuous wire-electrode tool is adapted to be engaged a plurality of times to form plural parallel stretches of said continuous wire-electrode tool and said planar current-conducting surface is adapted to be in contact with said plural parallel stretches of the wire-electrode tool.

4. The machine defined in claim 3, further means for introducing into said machining gap said liquid machining medium having abrasive particles suspended therein.

5. The machine defined in claim 4, further comprising a scraper member disposed downstream of said machining gap in each of said plural parallel stretches and shaped to accept said plural parallel stretches of the continuous wire-electrode tool fittedly therein for scraping off said abrasive particles adherent on said stretches, thereby preventing them from being carried onto said current-conducting surface.

6. A method of conducting a machining current to a continuous wire-electrode tool in a traveling-wire electroerosion machine including drive means for axially moving the wire-electrode tool which is tautly stretched from a supply site to a collection site along a predetermined path continuously extending between the supply and collection sites through the region of a workpiece, and power supply means having a pair of output terminals for feeding the machining current between the wire-electrode tool and the workpiece across a machining current flooded with a liquid machining medium, said method comprising the steps of:
  (a) applying a planar current-conducting surface of a brush block to the axially moving continuous wire-electrode tool at a predetermined location in said predetermined path so that said planar surface is urged into good sliding electrical contact with said wire-electrode tool;
  (b) feeding said machining current from said power supply means to said machining gap via said brush block and the sliding electrical contact it makes with said wire-electrode tool; and
  (c) rotating said brush block about an axis generally perpendicular to said planar current-conducting surface so as to move said surface in good tangential sliding contact with said wire-electrode tool.

7. A method as defined in claim 6, further comprising the step of scraping said axially-moving wire-electrode tool before it moves into physical contact with said planar current-conducting surface of said brush block, so as to remove mateirals adherent to said wire-electrode tool and thereby prevent such materials contaminating said planar surface.

* * * * *